United States Patent [19]
Fontana

[11] Patent Number: 5,888,564
[45] Date of Patent: Mar. 30, 1999

[54] METHOD OF FLAVORING AND TEXTURIZING FOOD PARTICLES AND THE FLAVORED AND TEXTURIZED FOOD PARTICLE

[75] Inventor: John A. Fontana, Kansas City, Mo.

[73] Assignee: Cereal Ingredients, Inc., Kansas City, Mo.

[21] Appl. No.: 926,322

[22] Filed: Sep. 5, 1997

Related U.S. Application Data

[63] Continuation of Ser. No. 573,056, Mar. 6, 1996, abandoned, which is a continuation-in-part of Ser. No. 414,280, Mar. 31, 1995, abandoned.

[51] Int. Cl.⁶ ..................................................... A23L 1/10
[52] U.S. Cl. .......................... 426/94; 426/104; 426/456; 426/516; 426/650
[58] Field of Search .............................. 426/94, 516, 456, 426/650, 104

[56] References Cited

U.S. PATENT DOCUMENTS

| | | | |
|---|---|---|---|
| 3,922,354 | 11/1975 | Galluzzi et al. | 426/516 |
| 4,710,386 | 12/1987 | Fulger et al. | 426/516 |
| 4,732,775 | 3/1988 | Millauer | 426/516 |
| 4,790,996 | 12/1988 | Roush et al. | 426/516 |
| 4,826,846 | 5/1989 | Rasco et al. | 426/18 |
| 5,061,497 | 10/1991 | Thacker et al. | 426/31 |
| 5,106,634 | 4/1992 | Thacker et al. | 42/31 |
| 5,332,585 | 7/1994 | Odermatt et al. | 426/516 |
| 5,395,623 | 3/1995 | Kovach | 426/456 |

FOREIGN PATENT DOCUMENTS 2210244  6/1989  United Kingdom .

*Primary Examiner*—Helen Pratt
*Attorney, Agent, or Firm*—Oppenheimer Wolff & Donnelly LLP

[57] ABSTRACT

The present invention includes a process for making a mixture of homogeneous texturizing or flavoring particles that include fiber and protein from a mixture of heterogeneous particles. The process includes providing a mixture of heterogeneous particles that comprises particles of a cereal grain having a flavor and a fiber concentration. The process also includes moistening the particles to form a dough-like mixture, extruding the mixture and cutting the extruded mixture to form homogeneous texturizing and flavoring particles. The present invention also relates to an edible flake that includes a cereal grain. The edible flake includes an imparted flavor and a fiber concentration.

14 Claims, No Drawings

METHOD OF FLAVORING AND TEXTURIZING FOOD PARTICLES AND THE FLAVORED AND TEXTURIZED FOOD PARTICLE

This is a continuation of prior application Ser. No. 08/573,056, filed Mar. 6, 1996, now abandoned; which was a Continuation-in-Part of 08/414,280, filed Mar. 31, 1995 now abandoned.

BACKGROUND OF THE INVENTION

The present invention relates to an extruded flavored and texturized particle and to a process for making the particle.

Process steps of mixing, transporting and storing a particulated bulk solid material have been exceedingly difficult to accomplish without detrimentally changing the bulk solid material. The detrimental changes have occurred as a consequence of particle segregation, particle breakage, particle reaction and degradation.

The particle segregation problem is exacerbated for bulk solid particle mixtures that include several different materials, i.e. heterogeneous particle mixtures. This is because the different materials have particles of different densities as well as different particle size distributions and different shapes. Particle based condiments are one type of heterogeneous particle mixture.

An additional problem for heterogeneous particle mixtures is one of surface properties of particles that cause some particles to stick to each other and subsequently segregate on the basis of weight. Some particles may be exceedingly brittle and break apart when the heterogeneous mixture is handled. These types of brittle particles are responsible for an inordinate amount of fines in a final mixed product.

Undesirable consequences result from segregation, breakage, and reaction of heterogeneous particles used to flavor food. Food flavoring is inconsistent within the particle mixture. The texture of the food also undesirably changes as a result of fines generation.

SUMMARY OF THE INVENTION

The present invention includes a process for treating heterogeneous solid particles used to flavor and texturize food to make a uniform mixture of homogeneous particles that include fiber, protein, starch and sugar, having use as a condiment, to flavor, texturize and embellish food. The process includes blending the heterogeneous particles with water to form a dough-like mixture. The heterogeneous particles include particles of a cereal grain. The dough-like mixture is passed through an extruder and is cut to form homogeneous texturizing and flavoring particles.

The present invention also includes an extruded particle comprising a cereal grain, the extruded particle having an imparted flavor or texture.

The present invention also includes a method for softening solid particles used to flavor and texturize food to make a uniform mixture of homogeneous particles that include fiber, protein, starch and sugar, having use as a condiment, to flavor, texturize and embellish food. The process includes blending the heterogeneous particles with water and one of either fat or flour to form a dough-like mixture. The heterogeneous particles include particles of a cereal grain. The dough-like mixture is passed through an extruder and is cut to form homogeneous texturizing and flavoring particles.

The present invention additionally includes an extruded particle predisposed to a soft mouthfeel comprising a cereal grain having an imparted flavor.

DETAILED DESCRIPTION OF THE PREFERRED EMBODIMENTS

The process of the present invention includes mixing heterogeneous particles of sugar, flour or fat, a starch bearing cereal grain with a flavoring emulsion and water to form a dough-like mixture. The dough-like mixture is extruded within a mixture temperature range of 75 to 250 degrees Fahrenheit. As the mixture exits the extruder, the mixture is cut to form homogeneous particles. The homogeneous particles are transferred to an oven and are dried. In one embodiment, the extruded, dried homogeneous particles are ground in a roller mill and are sieved to collect a desired homogeneous particle size distribution.

The present invention also includes an extruded, mixture of homogeneous particles having use as a food flavoring and as a texturizer. In one embodiment, the homogeneous particles are ground and classified and are applied to an external surface of foods such as pastry, doughnuts, cookies and so on.

In another embodiment, the homogeneous particles are of a bite size and are blended with another particulate food such as a breakfast cereal or a snack food. The combination of the other particulate food and the bite sized particles is a new food. The bite sized particles flavor and texturize the new food. Depending upon the range of particle sizes, and ingredient proportions, the homogeneous particle mixture may confer a crunchy texture and mouthfeel to the food.

In one other embodiment, the particles are added to a dough such as bread dough or cookie dough to simulate a natural particle such as a raisin. The particles may also be added to add a burst of flavor such as cinnamon or strawberry to the baked dough. It has surprisingly been found that the same particle can be used to impart either a crunchy mouthfeel, a firm mouthfeel or a soft mouthfeel.

Without undergoing softening, the bite-sized an extruded raisin-flavored bud added to bread softens from the "flinty" mouthfeel to a simulated natural raisin texture. The change in texture occurs after sixty minutes of proofing the bread dough and baking for eighteen minutes in an oven at 455° F. The "flinty" raisin bud does not soften to the same degree when added to a cookie dough and allowed to baked to 8–11 minutes in an oven at 380° F., however.

By adding flour to the pre-extrusion formula, the hardness can be adjusted so that the end user obtains a raisin-like texture with a shorter baking time as is shown in Example 1. Adding additional fat to the pre-extrusion formula adjusts the hardness so that the end user obtains a raisin-like texture with a shorter baking time as shown in Example 2. A softer product can also be obtained by increasing the moisture level in the finished product to a maximum of about 15% to 18% by weight as shown in Example 1. One other way to soften a product includes reducing the concentration of sugar in a particular formulation as shown in Example 1.

The range in softness conferred by varying amounts of flour, fat, sugar and/or moisture is virtually limitless. As a consequence, the method of the present invention can be used to simulate an exceedingly wide range of textures.

Softness can be conferred to some particles, particularly small particles, without additional end user baking. For example, a crumb cake topping can be made having a soft mouthfeel without baking. The bite-sized particles are rendered susceptible to softening prior to addition to dough. The particles are rendered susceptible to softening by addition of fat and/or flour to the heterogeneous mixture prior to extrusion.

It has been found that the addition of flour or fat renders the particles more receptive to water retention. Without the addition of fat or flour, the homogeneous particles have a percent water of 3 to 6 percent and will not retain additional water to a significant degree. Pre-treated homogeneous particles can retain a percent water of up to about 18 percent by weight and can be subsequently dried back to a percent moisture of 3 to 6 percent. The particles re-hydrate and re-soften once added to dough.

The significant benefit of this water retention characteristic is that an end user can purchase the dried flavor particles in large quantities. The end user can use the particles at his or her leisure in a dough or other matrix where the particles will re-hydrate. The particles have a much longer shelf-life than the natural particles that they replace, such as raisins.

In one other embodiment, the homogeneous particles are each eaten as a high fiber, high protein snack. The flavor of the snack may be imparted by the flavor emulsion added to the dough-like mixture. The flavor may also be the natural, imparted flavor of the particle enhanced through the cold extrusion step.

In one other embodiment, the particles are added to candy, such as a candy bar. In particular, the particles are added to a chocolate fraction of the candy. The particles may also be added to a nougat fraction of the candy. The particles impart a crunchy texture and mouthfeel to the candy bar.

The homogeneous particles impart a flavor to the food that, in one embodiment, is "nutty", caramel, and coconut. In one embodiment, toasted coconut particles are separately added to the homogeneous particles, after extrusion. It is also contemplated, however, that toasted coconut particles may be added to the homogeneous particles directly, before extrusion. The coconut is then captured within the particles during extrusion.

Other flavorings contemplated include fruit flavors such as blueberry, cherry, apple, lemon, dates, figs, raisins and so on; meat flavors such as chicken, beef, ham and so on; savory flavors such as barbecue, smoke, pepper, jalapeno, and so on; sweet flavors such as caramel, honey, butterscotch, maple, chocolate, grape, and so on; and grain flavors such as graham and rye. The flavors may be imparted as a liquid essence or as an atomized particle. Similarly to the coconut, the other flavorings may be separately added to the extruded homogeneous particles by spraying onto surfaces of the particles or may be coextruded with the particles.

As discussed, it is also contemplated that the extruded particles be usable without an additional imparted flavor. These particles have a grain flavor that may be sweet and "wheaty" in some applications and in other applications may be non-sweet or neutral. These particles may also have a flavor that is caramel-like.

The homogeneous texturizing and flavoring particle mixture and process for making the homogeneous particle mixture of the present invention are improvements over existing particulate-based flavoring and texturizing materials. In the process of the present invention, the ingredients are initially mixed to form the dough-like mixture and the dough-like mixture is subsequently extruded to form homogeneous particles.

Thus, flavoring and texturizing particles that originally have heterogeneous physical properties of size, density, texture and flavor are reformed by extrusion into homogeneous flavoring and texturizing particles. The homogeneous particles are thereby prevented from segregating into separate flavor particles and texturizing particles. Thus, the homogeneous particles of the present invention may be transported without substantial risk of particle segregation and without risk of substantial fines creation.

In one preferred embodiment, the process and product of the present invention make use of a high fiber, high protein material. The high fiber, high protein material may be imparted with a flavoring and, when extruded with other particles, has use as a food for human consumption. In one other embodiment, the process and product make use of a material such as wheat flour or other grain-based flour.

By the term "homogeneous" particles is meant particles having substantially the same physical and chemical properties. A mixture of homogeneous particles is one where each particle has substantially the same flavoring, texture or both flavor and texture. By the term "heterogeneous particles" is meant particles having different physical and chemical properties. Each particle in a heterogeneous mixture may have a different flavoring or a different texture.

Unlike a conventional, unextruded texturizing and flavoring mixture, the extruded homogeneous particles of the present invention may be either consumed whole or may be ground and classified to a desired, uniform size. In one embodiment, the homogeneous particles are formulated and are ground to a crumb size to make a softer product mixture. This added versatility permits the mixture of homogeneous particles to be adapted to more applications than conventional texturizing and flavoring mixtures. The versatility permits better coverage of a variety of food products by the mixture as compared to a conventional mixture of heterogeneous particles. This versatility also permits better blending with other food particles such as breakfast cereal and particulate snack food.

It has surprisingly been found by reforming the particles by extrusion to homogeneous particles, that the flavor, as determined organoleptically, is richer and has greater intensity in the homogeneous particle mixture than in heterogeneous particle mixtures made with the same ingredients. The finding is surprising because the mixture weight of an emulsion imparting flavor is the same for both heterogeneous and homogeneous particles. It has also been found that because of the richer and more intense flavor of the homogeneous particles, a significantly smaller quantity of ingredients such as toasted coconut, berries, bananas, apple and chocolate are required to be mixed with the ground homogeneous particle mixture to impart a desired flavor and increased flavor intensity. This is desirable to a consumer because these ingredients tend to be high in fat, calories and cholesterol. This is desirable, also, because of a resultant lower cost. The process of the present invention also permits multiple flavoring of individual particles.

It is believed that in the process of the present invention, one or more flavorings are released and dispersed by extrusion into each of the homogeneous particles of the present invention. In one specific embodiment, the "nutty" flavor of the starch bearing cereal grain and imparted flavor of the flavor emulsion are blended into a single particle.

In addition to extruding a flavoring with the dough-like mixture, and blending extruded particles with a flavor particle such as coconut, the present invention includes a step of spraying either droplets or atomized particles of flavoring on surfaces of extruded particles.

Because the particles of different sizes and densities are held in the single dough-like matrix which is extruded, and may be ground and classified, the final mixture of homogeneous particles has a uniform and narrow particle size distribution. Thus, the ground particle embodiment of the homogeneous mixture can provide improved coverage on a food such as a donut, cereal particle, candy bar, and ice cream bar.

As described, in one preferred embodiment, each of the extruded homogeneous particles is made from ingredients of flour, sugar, shortening, a high fiber, high protein starch-bearing cereal grain that includes a sugar mixture, along with a flavoring emulsion, artificial color, and water.

A preferred flour is wheat flour. Other flours such as corn flour, oat flour and rice flour are also suitable for use. Flour type may be selected to be compatible with another type of particles blended with the extruded particles such as corn flakes or oat bran.

In one preferred embodiment, the high fiber, high protein starch-bearing cereal grain is prepared with 60 to 80 percent by weight of the starch converted to a soluble form and 4 to 30 percent by weight converted to a sugar-based mixture with 70 percent maltose and less than 5 percent glucose. The cereal grain is preferably a wheat grain that is enzymatically converted to the soluble form. Other acceptable grains include rice, oats, corn, barley, sorghum, rye and combinations of these grains. One cereal grain preparation suitable for use in the present invention is described in the Kovach Patent, U.S. Pat. No. 5,395,623, that issued on Mar. 7, 1995. This patent is herein incorporated by reference.

In one embodiment, the cereal grain described in the Kovach patent had a total dietary fiber of about 33 percent by weight and a protein concentration of about 27% dry weight. This cereal grain may be obtained in a process of producing alcohol from grain. This embodiment of the present invention imparts a product with a caramel flavor.

In one other embodiment, the high protein, high fiber cereal grain ingredient is also obtained in a process of producing alcohol from grain. In this embodiment, the cereal grain has an enzymatic starch conversion of 90 to 100 percent. Suitable cereal grains include wheat, corn, oats, rice, barley, sorghum, rye and combinations of these grains. The grains have a protein content range of 17 to 30 percent, on a dry matter basis. The grains have a total dietary fiber content on a dry matter basis of between 30 and 70 percent by weight and a nitrogen free extract content on a dry weight basis of less than 40 percent. The particles have a coating of residual sugars from the enzymatic conversion of starch which is 17 to 30 percent by weight on a dry matter basis.

In one other embodiment, the process and product are free of the high protein, high fiber cereal grain. Instead, the process and product include a conventional flour such as a wheat flour.

In one embodiment, heterogeneous ingredients described were mixed and extruded in a Wenger extruder, Model No. X1-155, manufactured by the Wenger Company of Sabetha, Kans. The ingredients were mixed without steam addition. The extruder included a barrel that enclosed a screw with a diameter of 7.542 inches. The screw rotated at about 300 rpm within the barrel.

In one preferred embodiment, the extruder was fitted with a die at the outlet. The die had a face with holes, ranging in number from two to eight, each hole having a diameter of one inch. Dies having holes ranging in diameter from $\frac{1}{16}$ inch to 1 inch provide acceptable results. In one eight hole embodiment, the holes were positioned concentrically in the face.

At the outlet of the extruder, after the die, was a cutter of blade-type rotating within a range of 200 to 2000 rpm. In one embodiment, the blade rotated at about 250 rpm. The cutter was rotated at an rpm speed to make homogeneous particles of a size that adequately dried in an oven to a moisture content of 3 to 6 percent by weight.

A knife cut the extruded mixture into small homogeneous particles having a diameter of about the size of a United States quarter and a thickness of about one-eighth inch. The mixture did not puff as it exited the die.

In one embodiment, once the extruded homogeneous particles were formed by the cutter, the particles were dried in a Wenger oven, manufactured by the Wenger Company of Sabetha, Kans. The particles were preferably dried at approximately 225° F. for 5.3 minutes in a first chamber and 275° F. for 5.3 minutes in a second chamber.

Upon drying, the particles were cooled for about ten minutes. Once cooled, in one embodiment, the homogeneous particles were transferred to a roller mill and ground to a desired size. The desired size depended upon the specific application.

The homogeneous product mixture was further refined by passing through a series of sieves. The sieve arrangement permitted "overs" to be returned to the mill and fines to be collected and returned to the original pre-extrusion mixture. Homogeneous particles within a desired size range were sent to a holding bin.

For one embodiment, particles in the holding bin were mixed with a toasted coconut ingredient and were packaged to make the extruded donut crunch product. It is contemplated that flavors other than coconut may be blended with the particle mixture of the present invention. Other flavors include chocolate, vanilla and strawberry, banana, apple and other berry flavors. Other non-fruit flavors suitable for use, such as meat and savory flavors, have been described.

In another embodiment, particles are flavor buds. In one embodiment, the buds have a diameter of about $\frac{3}{8}$ inches. It is understood, however, that buds may be made in a wide range of sizes. The buds may have a texture that ranges from hard to firm to soft. The buds may have a flavor intensity range of regular to high and may be flavored with artificial flavors, natural flavors or fruit flavors.

The flavoring and texturizing product of the present invention also includes a flaked product. Extruded particles prepared in the process described are transferred to a flaking mill where the particles are flaked. Next, the flaked particles are toasted in a toaster to a moisture of about 3% by weight. The flaked particles may alternately be dried in an oven, without toasting. In one embodiment, the toasted particles are then enrobed with a desired flavor and are cooled. Once cooled, the flakes are packaged. In another embodiment, the flaked particles are free from added flavor.

In one embodiment, the homogeneous particles were used to make a donut crunch, for application to a doughnut surface, having the following ingredients with the following weight percent:

| Formula | Weight Percent |
| --- | --- |
| Granulated Sugar | 41.44 |
| Shortening | 3.49 |
| Cereal Grain | 10.61 |
| Wheat Flour | 30.58 |
| Coconut Emulsion | 0.62 |
| Artificial Color | 0.15 |
| Water | 7.49 |
| Toasted Coconut | 5.62 |

To make the donut crunch, all ingredients were preblended in a horizontal mixture for about five minutes, except shortening, water and coconut to make a blended mixture. The shortening was melted in a separate vessel. The blended ingredients were transferred to a holding bin positioned above the extruder barrel. The blended ingredients were then transferred to a mixing chamber at an inlet of the extruder at a substantially uniform rate.

Once the uniform rate was achieved, water and melted shortening ingredients were metered into the mixing chamber to make a moistened mixture having the concentrations described above. The moistened mixture was transferred to the mixing chamber and into the extruder. No additional steam or water was introduced into the extruder.

As the mixture exited the extruder through the die, the mixture was cut into small homogeneous pieces. In one embodiment, the small homogeneous pieces were transferred to a perforated band belt oven. The oven included two chambers that were each independently temperature controlled. The control permitted adjustments in retention time in each chamber. The extruded product was dried at 225 degrees Fahrenheit for 5.3 minutes in chamber 1 and at 275 degrees Fahrenheit for 5.3 minutes in chamber 2. The product was transferred through the chambers by the perforated band.

Once dried, the extruded product was cooled for ten minutes on the perforated band. The product was transferred to a roller mill and ground to a desired size. A series of sieves following the roller mill classified the product. Overs were returned to the mill for further grinding. Fines were collected and returned to the initial preblended mixture for a second extrusion. Particles within the desired classification range were sent to a holding bin. Prior to packaging, toasted coconut was metered at a desired rate.

It has been found that by adjusting flour and shortening concentrations to high ends of the ranges described for the doughnut crunch product, and sugar concentration to a low end of the range described for the crunch, a softer particle product is obtained. It is believed that this adjustment of ingredients may increase pore size within the particles and may also decrease thickness of walls enclosing pores as well as embrittle the walls.

The following examples are presented to illustrate manipulations of flour, sugar and fat concentrations to change particle texture. The examples are not intended to limit the present invention.

EXAMPLE 1

A flavor bud of the present invention having a flinty mouthfeel that does not substantially soften is made with the following percent composition by weight:

| Ingredients | Weight Percent |
| --- | --- |
| Sucrose | 50.00% |
| Flour | 23.75% |
| Absorption | 11.81% |
| Other | 14.44% |

Flavor bud particles having a soft texture and flavor bud particles being predisposed to having a soft texture have the following formulation:

| Ingredients | Weight Percent |
| --- | --- |
| Sucrose | 26.00% |
| Flour | 47.75% |
| Absorption | 17.57% |
| Other | 8.68% |

Thus, to soften the particles, the sucrose was reduced by about one-half and the flour concentration was approximately doubled. The moisture absorption of the particles increased from about 11.8% of total particle weight to 17.6% of total particle weight. While particular proportions of sugar, flour and moisture absorption have been described, it is understood that other proportions can be used to achiever other degrees of softness.

EXAMPLE II

One embodiment of the present invention made with the high fiber ingredient described in the Kovach patent, U.S. Pat. No. 5,395,623, is as follows:

| Ingredient | Percent Composition By Weight |
| --- | --- |
| Oil | 2.5% |
| Flour | 26.0% |
| Sucrose | 45.0% |
| Kovach Ingredient | 13.0% |
| Absorption | 9.0% |
| Other | 4.5% |

This formulation produces a particle having a firm or flinty mouthfeel.

The particle made by this formulation can be softened or predisposed to softening with the following formulation:

| Ingredient | Percent Composition by Weight |
| --- | --- |
| Oil | 4.0% |
| Flour | 24.5% |
| Sucrose | 43.0% |
| Kovach Ingredient | 15.0% |
| Absorption | 10.0% |
| Other | 3.5% |

In this instance, the particle is softened by approximately doubling the oil concentration.

Although the present invention has been described with reference to preferred embodiments, workers skilled in the art will recognize that changes may be made in form and detail without departing from the spirit and scope of the invention.

What is claimed is:

1. A method for reversibly softening an extruded flavoring particle substantially indispersable in water, comprising:
    preparing a heterogeneous mixture that includes particles with a protein component and a fiber component and water;
    adding one of the ingredients of fat in a concentration of at least about 4% by weight or wheat flour in a concentration of at least about 45% by weight to the mixture;
    extruding the mixture without addition of heat other than the heat generated by extrusion to make homogeneous extruded particles; and
    cutting the extruded homogeneous particles after extrusion.

2. Particles made by the process of claim 1.

3. A method for reversibly softening an extruded flavoring particle that retains its particulate form in water, comprising:

preparing a heterogeneous mixture that includes particles with a protein component and a fiber component and water;

adding fat to the mixture in a concentration of not more than about 3% by weight;

adding flour to the mixture in a concentration of not more than about 50% by weight;

extruding the mixture without addition of heat other than the heat generated by extrusion to make homogeneous extruded particles; and cutting the extruded homogeneous particles after extrusion.

4. The process of claim 1 and further including drying the homogeneous particles.

5. The process of claim 1 and further including grinding the homogeneous particles to form ground particles.

6. The process of claim 5 and further including classifying the ground homogeneous particles.

7. The process of claim 5 and further including adding additional particles to the homogeneous mixture.

8. The process of claim 7 wherein the additional particles are coconut flakes.

9. The process of claim 8 wherein the additional particles are cereal particles.

10. The process of claim 1 and further including flavoring the extruded particles.

11. The process of claim 10 wherein the particles are flavored by an addition of a flavor emulsion to the mixture prior to extrusion.

12. The process of claim 10 wherein the particles are flavored by an addition of flavor particles to the mixture prior to extrusion.

13. The process of claim 10 wherein the particles are flavored by an addition of flavoring to the extruded particles after extrusion.

14. The process of claim 10 wherein the flavoring is selected from the group consisting of: berry, banana, apple, cherry, plum, figs, date, meat, barbecue, chocolate, vanilla, cinnamon, graham, peanut, and coconut.

* * * * *

UNITED STATES PATENT AND TRADEMARK OFFICE
CERTIFICATE OF CORRECTION

PATENT NO. : 5,888,564

DATED : March 30, 1999

INVENTOR(S) : John A. Fontana

It is certified that error appears in the above-identified patent and that said Letters Patent is hereby corrected as shown below:

Col. 2, Line 36, after "bite-sized," please insert --particles have a "flinty" mouthfeel. In one embodiment,--;

Col. 6, Line 62, delete the word "Artiticial" and insert the word --Artificial--;

Col. 7, Line 46, after "are presented," please delete "toillustrate" and insert --to illustrate--;

Col. 8, Line 15, delete the word "achiever" and insert the word --achieve--.

Signed and Sealed this

Twenty-seventh Day of July, 1999

Attest:

Q. TODD DICKINSON

*Attesting Officer*  *Acting Commissioner of Patents and Trademarks*